(12) United States Patent
Guo

(10) Patent No.: US 8,223,708 B2
(45) Date of Patent: Jul. 17, 2012

(54) METHOD AND APPARATUS FOR HANDLING SCHEDULING INFORMATION REPORT

(75) Inventor: Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 439 days.

(21) Appl. No.: 12/478,759

(22) Filed: Jun. 4, 2009

(65) Prior Publication Data

US 2009/0303954 A1 Dec. 10, 2009

Related U.S. Application Data

(60) Provisional application No. 61/060,457, filed on Jun. 10, 2008.

(51) Int. Cl.
*H04W 72/04* (2009.01)
(52) U.S. Cl. .................................. 370/329; 455/450
(58) Field of Classification Search ................ None
See application file for complete search history.

(56) References Cited

U.S. PATENT DOCUMENTS

| | | | |
|---|---|---|---|
| 2009/0088195 A1* | 4/2009 | Rosa et al. | 455/507 |
| 2009/0109907 A1* | 4/2009 | Tsai et al. | 370/329 |
| 2009/0125650 A1* | 5/2009 | Sebire | 710/57 |
| 2009/0163211 A1* | 6/2009 | Kitazoe et al. | 455/436 |
| 2010/0177788 A1* | 7/2010 | Chun et al. | 370/474 |
| 2010/0189007 A1* | 7/2010 | Chun et al. | 370/252 |
| 2011/0096725 A1* | 4/2011 | Chun et al. | 370/328 |

FOREIGN PATENT DOCUMENTS

WO 2009040773 A2 4/2009

OTHER PUBLICATIONS

3GPP, R2-082902, "36.321 CR covering agreements of RAN2 #61bis and RAN2#62", May 2008.
3GPP, R2-082197, "Power Headroom Reporting", May 2008.
3GPP, R2-082903, "CR to 36.331 on Miscelaneous clarifications/corrections", May 2008.
3GPP, R2-082859, "User plane session report", May 2008.
3GPP TS 36.321 V8.2.0 (May 2008), Technical Specification, 3rd Generation Partnership Project; Technical Specification Group Radio Access Network; Evolved Universal Terrestrial Radio Access (E-UTRA) Medium Access Control (MAC) protocol specification (Release 8), P1-P33.
Office Action on corresponding KR patent application No. 10-2009-0051471 from KIPO issued on Mar. 11, 2011.
Alcatel-Lucent: "TP on Power Headroom reporting", 3GPP TSG RAN WG2 #62, R2-082224, May 5-9, 2008, XP050139993, Kansas City, US.
Panasonic: "Priority handling of MAC Control Elements", 3GPP TSG RAN WG2#62, R2-082227, XP002537451, May 5-9, 2008, Kansas City, USA.
3rd Generation Partnership Project; Technical Specification Group Radio Access Network: "Evolved Universal Terrestrial Radio Access (E-UTRA) Medium Access Control (MAC) protocol specification (Release 8)", 3GPP TS 36.321 V8.1.0, XP002537450, Mar. 2008, 3GPP support office, France.

* cited by examiner

*Primary Examiner* — Min Jung
(74) *Attorney, Agent, or Firm* — Blue Capital Law Firm, P.C.

(57) ABSTRACT

The present invention provides a method for handling scheduling information report in a user equipment (UE) of a wireless communication system. The method includes steps of triggering a Buffer Status Report (BSR), which is a Regular BSR, and a Power Headroom Report (PHR); and performing resource allocation when having uplink resource allocated for new transmission, wherein resource allocation priority of a MAC control element of the BSR is higher than that of the PHR.

12 Claims, 4 Drawing Sheets

METHOD AND APPARATUS FOR HANDLING SCHEDULING INFORMATION REPORT

CROSS REFERENCE TO RELATED APPLICATIONS

This application claims the benefit of U.S. Provisional Application No. 61/060,457, filed on Jun. 10, 2008 and entitled "Method and apparatus for handling the priority between BSR and PHR in a wireless communication system", the contents of which are incorporated herein by reference.

BACKGROUND OF THE INVENTION

1. Field of the Invention

The present invention relates to a method and apparatus for handling a scheduling information report, and more particularly, to a method and apparatus for handling resource allocation priority of the scheduling information report in a user equipment (UE) of a wireless communication system.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

In LTE system, a MAC Protocol Data Unit (PDU) consists of a MAC header, zero or more MAC Service Data Units (SDUs), zero or more MAC control elements, and optionally padding. A MAC PDU header consists of one or more MAC PDU sub-headers, each corresponding to either a MAC SDU, a MAC control element or padding. The MAC PDU sub-headers have the same order as the corresponding MAC SDUs, MAC control elements and padding. A MAC PDU sub-header corresponding to a MAC control element generally consists of two Reserved bits, an 1-bit Extension field and a 5-bit Logic Channel ID (LCID) field, i.e. 8 bits in total.

According to the current specification, MAC control elements transmitted by a UE include a buffer status report (BSR) MAC control element and a power headroom report (PHR) MAC control element. The BSR MAC control element is generated by a Buffer Status reporting procedure, and is used to provide the serving base station, or called enhanced Node B (eNB), with information about the amount of data in the uplink (UL) buffers of a UE for scheduling of uplink transmission. The PHR MAC control element is generated by a Power Headroom reporting procedure, and is used to provide the serving eNB with information about the difference between the maximum UE transmission (TX) power and an estimated TX power for Uplink Share Channel (UL-SCH).

There are three types of BSR for different triggering events, a regular BSR, a periodic BSR and a padding BSR. The regular BSR is triggered when UL data arrives at the UE transmission buffer and the UL data belongs to a logical channel with higher priority than those for which data already existed in the UE transmission buffer, or is triggered when a serving cell change occurs. The periodic BSR is triggered when a PERIODIC BSR TIMER expires. The padding BSR is triggered when UL resources are allocated and an amount of padding bits is equal to or greater than the size of the BSR MAC control element.

According to different requirements, the BSR MAC control elements can be categorized into two formats: short and long. A short BSR MAC control element is 1-byte long, and has 8 bits, where the former 2 bits indicate one Logic Channel Group which buffer status is being reported, and the remaining six bits indicate the amount of buffered data available across the Logic Channel Group. A long BSR MAC control element is 3-byte long, and utilized for reporting data amount of the UL buffers of all the Logic Channel Groups.

For the regular and periodic BSR, the format of the BSR MAC control element is determined by the UE according to whether there is more than one Logic Channel Group with uplink buffered data in the UE when the BSR is transmitted. If there is only one Logic Channel Group with uplink buffered data, the short BSR MAC control element is reported. Conversely, if there are more than one Logic Channel Groups with uplink buffered data, the long BSR MAC control element is reported.

For the padding BSR, the BSR MAC control element format is determined according to the number of padding bits remaining in the MAC PDU. If the number of padding bits is equal to or larger than the size of the short BSR MAC control element but smaller than the size of the long BSR MAC control element, the short BSR MAC control element is used, for reporting data amount in the uplink buffer of a highest priority Logic Channel Group. Conversely, if the number of padding bits is equal to or larger than the size of the long BSR MAC control element, the long BSR MAC control element is used, for reporting data amount in the uplink buffer of all the Logic Channel Groups.

After the BSR is triggered, if the UE has UL resources allocated for a new transmission for a current Transmission Time Interval (TTI), the UE generates a BSR MAC control element to report information about the amount of data in the UL buffers, such that the network can determine the total amount of data available across one or all logical channel groups. Conversely, if the UE does not have UL resources allocated for a new transmission for this TTI and the triggered BSR is a Regular BSR, a Scheduling Request (SR) procedure shall be triggered, for requesting the network to allocate an uplink grant for the UE. As a result, the BSR can be transmitted.

On the other hand, a PHR is triggered if any of the following events occur: (1) a timer "PROHIBIT_PHR_TIMER" for prohibiting power headroom reporting expires or has expired and a path loss of the UE has changed more than a predetermined value "DL_PathlossChange" since the last power headroom report; and (2) a PERIODIC PHR TIMER expires, in which case the PHR is referred below to as "Periodic PHR". After the PHR is triggered, if the UE has UL resources allocated for a new transmission for this TTI, the UE obtains the value of the power headroom from the physical layer to generate a PHR MAC control element, and restarts the timer "PROHIBIT_PHR_TIMER". Besides, if the triggered PHR is a "Periodic PHR", the UE restarts the PERIODIC PHR TIMER. It should be noted that when periodic Power Headroom Reporting is configured, the first report should be included immediately when the UE has a grant for a new transmission.

When both BSR and PHR are triggered, since the PHR MAC control element requires 2 bytes for transmission (i.e. one byte PHR MAC control element with one byte MAC sub-header), an uplink grant of at least 4 bytes (a short BSR MAC control element plus its MAC sub-header and a PHR MAC control element plus its MAC sub-header) or 6 bytes (a long BSR MAC control element plus its MAC sub-header and a PHR MAC control element plus its MAC sub-header) are needed by the UE.

In some cases, the UL grant may be insufficient to include both two reports:

(1) The UL grant is requested by sending Scheduling Request (SR) via Physical Uplink Control Channel (PUCCH). Because eNB doesn't know which MAC control elements, e.g. short BSR, long BSR, and/or PHR, are triggered in the UE side, it may allocate the UL grant with the size smaller than 6 bytes to prevent resource waste.

(2) The UL grant is requested by sending SR via a Random Access (RA) procedure. When the Random Access procedure is initiated due to uplink data arrival, the UE first transmits a RA preamble to request an uplink grant and transmits the uplink data by a message 3 (Msg3) on Uplink Share Channel (UL-SCH). Since the smallest size of the UL grant for Msg3 is 80 bits, after including a Cell Radio Network Temporary Identifier (C-RNTI) and a Cyclic Redundancy Check (CRC) code, only 4 bytes are left. Consequently, a long BSR MAC control element and a PHR MAC control element can't be included in the same Transport Block (TB), i.e. MAC PDU, for transmission.

According to the current specification, a priority between BSR and PHR is not specified. Besides, when a Regular BSR and a PHR are triggered, if the UL grant is 4 bytes left and the priority of the PHR is higher than that of the Regular BSR, in addition to a PHR MAC control element, a short BSR MAC control element triggered by a padding BSR will also be transmitted. Then, the BSR trigger is no longer pending. At this time, if the UE has more than one Logic Channel Groups with uplink buffered data, since the short BSR MAC control element can only provide information about buffered data amount of one Logic Channel Group, the network has to wait for the next BSR MAC control element sent by the UE to know complete data amount in the uplink buffer of the UE. It results in bad resource scheduling and bad UL transmission performance of the UE.

SUMMARY OF THE INVENTION

It is therefore an objective of the present invention to provide a method and apparatus for handling a scheduling information report in a user equipment (UE) of a wireless communications system, so as to enhance the performance of system resource scheduling and uplink transmission of the UE.

According to the present invention, a method for handling a scheduling information report in a user equipment (UE) of a wireless communication system is disclosed. The method includes steps of triggering a Buffer Status Report (BSR) and a Power Headroom Report (PHR), wherein the BSR is a regular BSR; and performing resource allocation when having uplink resource allocated for a new transmission, wherein resource allocation priority of a MediumAccess Control (MAC) control element of the BSR is higher than that of the PHR.

According to the present invention, a communications device for handling a scheduling information report in a user equipment (UE) of a wireless communication system is disclosed. The communications device includes a processor for executing a program code, and a memory, coupled to the processor, for storing the program code. The program code includes steps of triggering a Buffer Status Report (BSR) and a Power Headroom Report (PHR), wherein the BSR is a regular BSR; and performing resource allocation when having uplink resource allocated for a new transmission, wherein resource allocation priority of a MediumAccess Control (MAC) control element of the BSR is higher than that of the PHR.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
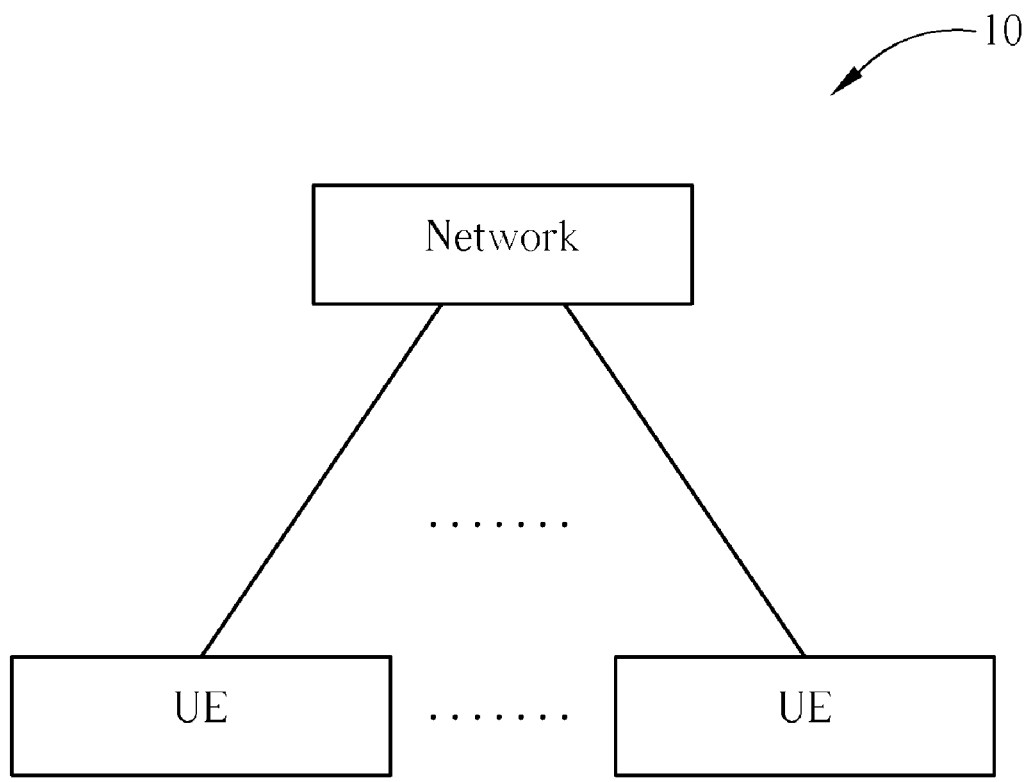
FIG. 1 is a schematic diagram of a wireless communications system.

Please refer to FIG. 1, which illustrates a schematic diagram of a wireless communications system 10. The wireless communications system 10 is preferred to be an LTE (long-term evolution) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
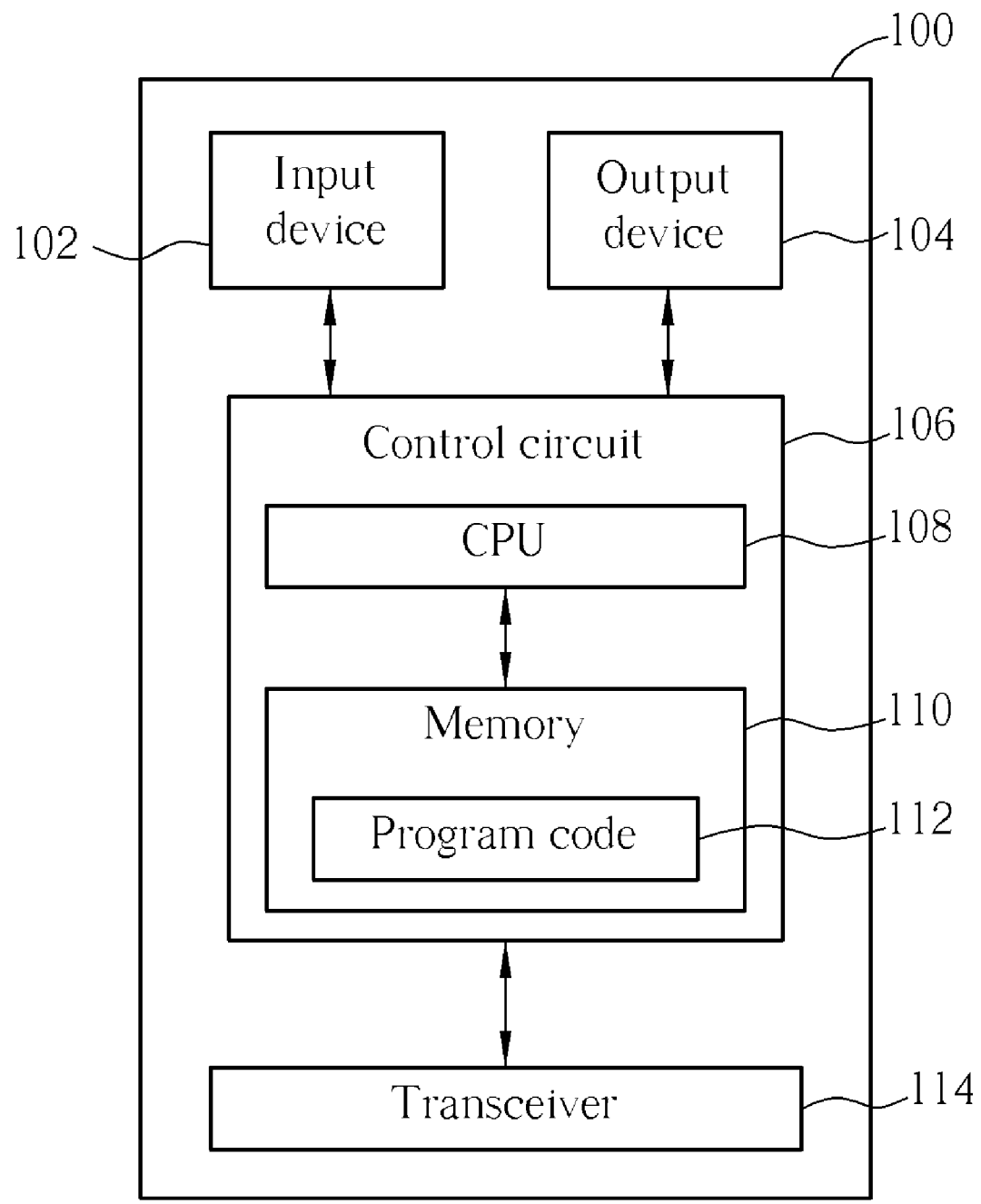
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
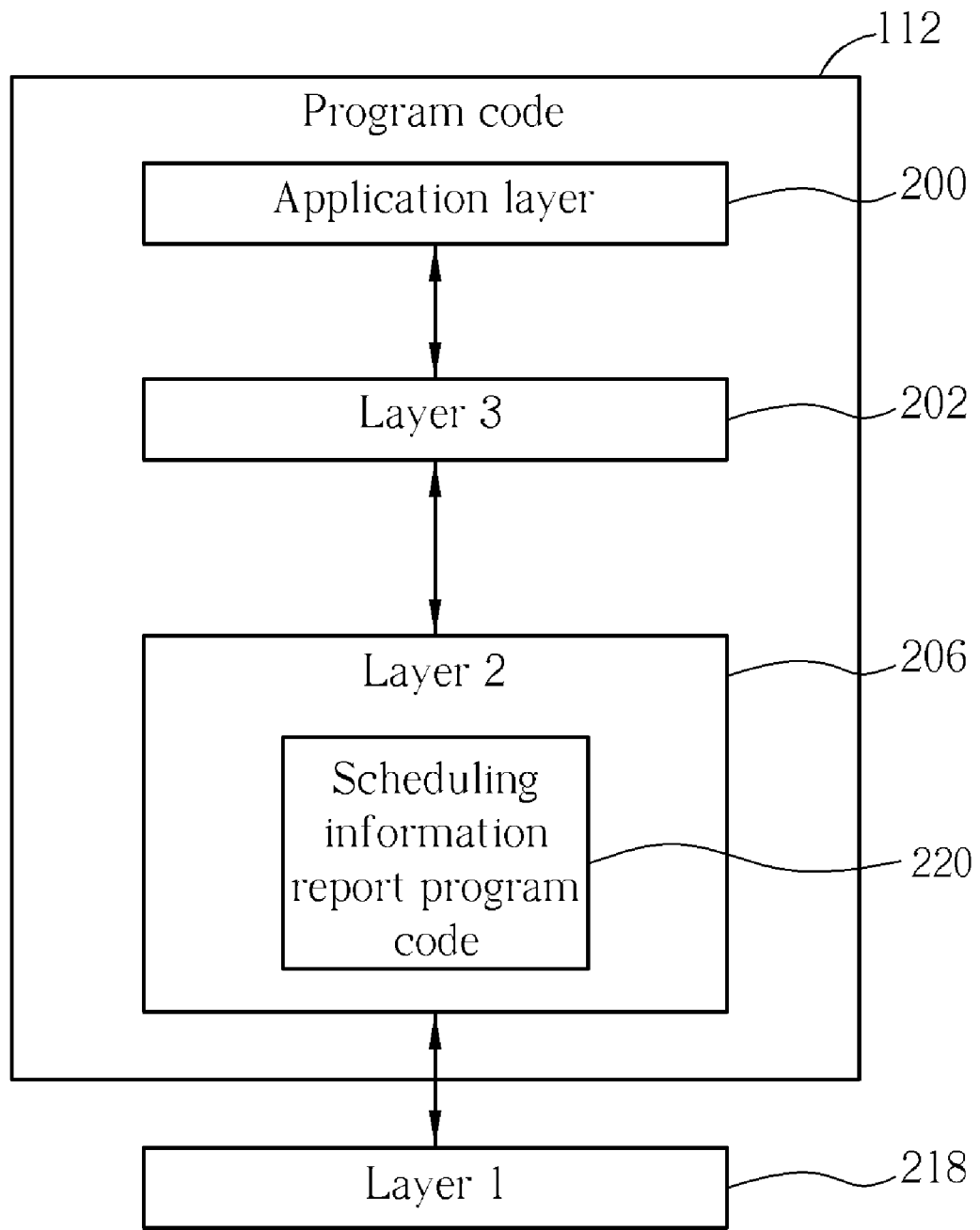
FIG. 3 is a diagram of program code of FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

In LTE system, the MAC layer of the Layer 2 206 performs a Buffer Status reporting procedure and a Power Headroom reporting procedure, to report scheduling information such as uplink buffer status or power usage status to the serving base station, such that the network can allocate transmission resource and make scheduling decision efficiently. In such a situation, the embodiment of the present invention provides a scheduling information report program code 220 for handling a scheduling information report in a UE, so as to enhance the performance of system resource scheduling and uplink transmission of the UE.

Figure 4:
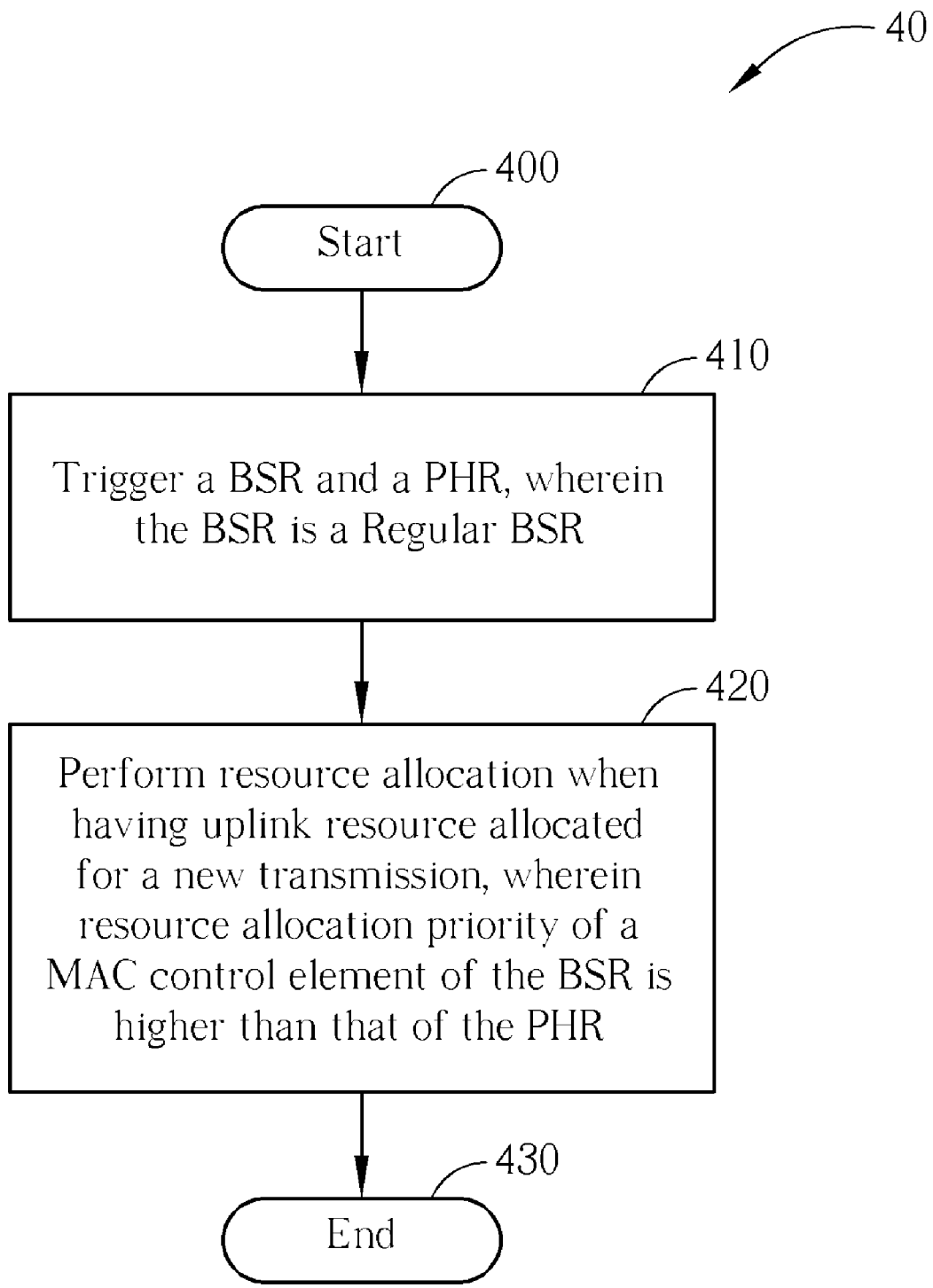
FIG. 4 is a flowchart of a process according to an embodiment of the present invention.

Please refer to FIG. 4, which illustrates a schematic diagram of a process 40. The process 40 is utilized for handling a scheduling information report in a UE of the wireless communications system 10, and can be compiled into the scheduling information report program code 220. The process 40 includes the following steps:

Step 400: Start.

Step 410: Trigger a Buffer Status Report (BSR) and a Power Headroom Report (PHR), wherein the BSR is a Regular BSR.

Step 420: Perform resource allocation when having uplink resource allocated for a new transmission, wherein resource allocation priority of a Medium Access Control (MAC) control element of the BSR is higher than that of the PHR.

Step 430: End.

According to the process 40, after triggering the BSR and the PHR, the UE performs resource allocation when having uplink resource allocated for anew transmission, wherein the BSR is a Regular BSR and the resource allocation priority of the MAC control element for the BSR is higher than that for the PHR.

Besides, the step of performing the resource allocation is deciding data content carried in a MAC Protocol Data Unit (PDU) to be transmitted to a network of the wireless communications system, which is well known by those skilled in the art, and is not further described herein.

Compared to power usage status of the UE, the buffer status of the UE is more critical for the network to allocate the transmission resource. Thus, in the embodiment of the present invention, the resource allocation priority of the BSR MAC control element is set higher than the PHR MAC control element. Consequently, when both the BSR and the PHR are triggered, if the uplink resource allocated by the network (i.e. uplink grant) is insufficient for the UE to accommodate both the BSR MAC control element and the PHR MAC control element, the UE according to the embodiment of the present invention uses the allocated resource to accommodate the BSR MAC control element in a high priority, for enhancing the performance of system resource scheduling and uplink transmission of the UE.

For example, if the uplink grant is requested by sending a Scheduling Request (SR) via Physical Uplink Control Channel (PUCCH), since the network doesn't know which MAC control elements, e.g. short BSR, long BSR, and/or PHR, are triggered in the UE side, it may allocate the UL grant with the size smaller than 6 bytes to prevent resource waste. Else, if the UL grant is requested by sending SR via a Random Access (RA) procedure, since the smallest size of the UL grant allocated for Msg3 is 80 bits, after including a Cell Radio Network Temporary Identifier (C-RNTI) and a Cyclic Redundancy Check (CRC) code, only 4 bytes are left.

In such a situation, a long BSR MAC control element and a PHR MAC control element can't be included in the same MAC PDU for transmission. According to the embodiment of the present invention, the UE generates and transmits the BSR MAC control element in a high priority, so as to overcome the problem caused in the prior art.

In summary, when both the BSR and the PHR are triggered, the resource allocation priority of the BSR MAC control element is set higher than the PHR MAC control element in the embodiment of the present invention, for enhancing the performance of system resource scheduling and uplink transmission of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a scheduling information report in a user equipment (UE) of a wireless communication system, the method comprising:

triggering a Buffer Status Report (BSR) and a Power Headroom Report (PHR), wherein the BSR is a Regular BSR; and performing resource allocation when having uplink resource allocated for a new transmission, wherein resource allocation priority of a Medium Access Control (MAC) control element for the BSR is higher than that for the PHR.

2. The method of claim 1, wherein performing the resource allocation is deciding data content carried in a MAC Protocol Data Unit (PDU) to be transmitted to a network of the wireless communications system.

3. The method of claim 1, wherein the MAC control element of the BSR is a long BSR MAC control element.

4. The method of claim 1, wherein the uplink resource is requested by a Scheduling Request (SR) procedure.

5. The method of claim 4, wherein the uplink resource is requested by the SR procedure via a Physical Uplink Control Channel (PUCCH).

6. The method of claim 4, wherein the uplink resource is requested by the SR procedure via a Random Access procedure.

7. A communication device for handling a scheduling information report in a user equipment (UE) of a wireless communication system, the communication device comprising:

a processor for executing a program code; and a memory coupled to the processor for storing the program code; wherein the program code comprises:

triggering a Buffer Status Repo (BSR) and a Power Headroom Report (PHR), wherein the BSR is a Regular BSR; and performing resource allocation when having uplink resource allocated for a new transmission, wherein resource allocation priority of a Medium Access Control (MAC) control element for the BSR is higher than that for the PHR.

8. The communication device of claim 7, wherein performing the resource allocation is deciding, data content carried in a MAC Protocol Data Unit (PDU) to be transmitted to a network of the wireless communications system.

9. The communication device of claim 7, wherein the MAC control element of the BSR is a long BSR MAC control element.

10. The communication device of claim 7, wherein the uplink resource is requested by a Scheduling Request (SR) procedure.

11. The communication device of claim 10, wherein the uplink resource is requested by the SR procedure via a Physical Uplink Control Channel (PUCCH).

12. The communication device of claim 10, wherein the uplink resource is requested by the SR procedure via a Random Access procedure.

* * * * *